Sept. 7, 1954 G. W. ASHLOCK, JR 2,688,352
FRUIT PITTER HAVING MOVABLE HOLDERS FOR POSITIONING FRUIT
Filed April 14, 1952 3 Sheets-Sheet 1
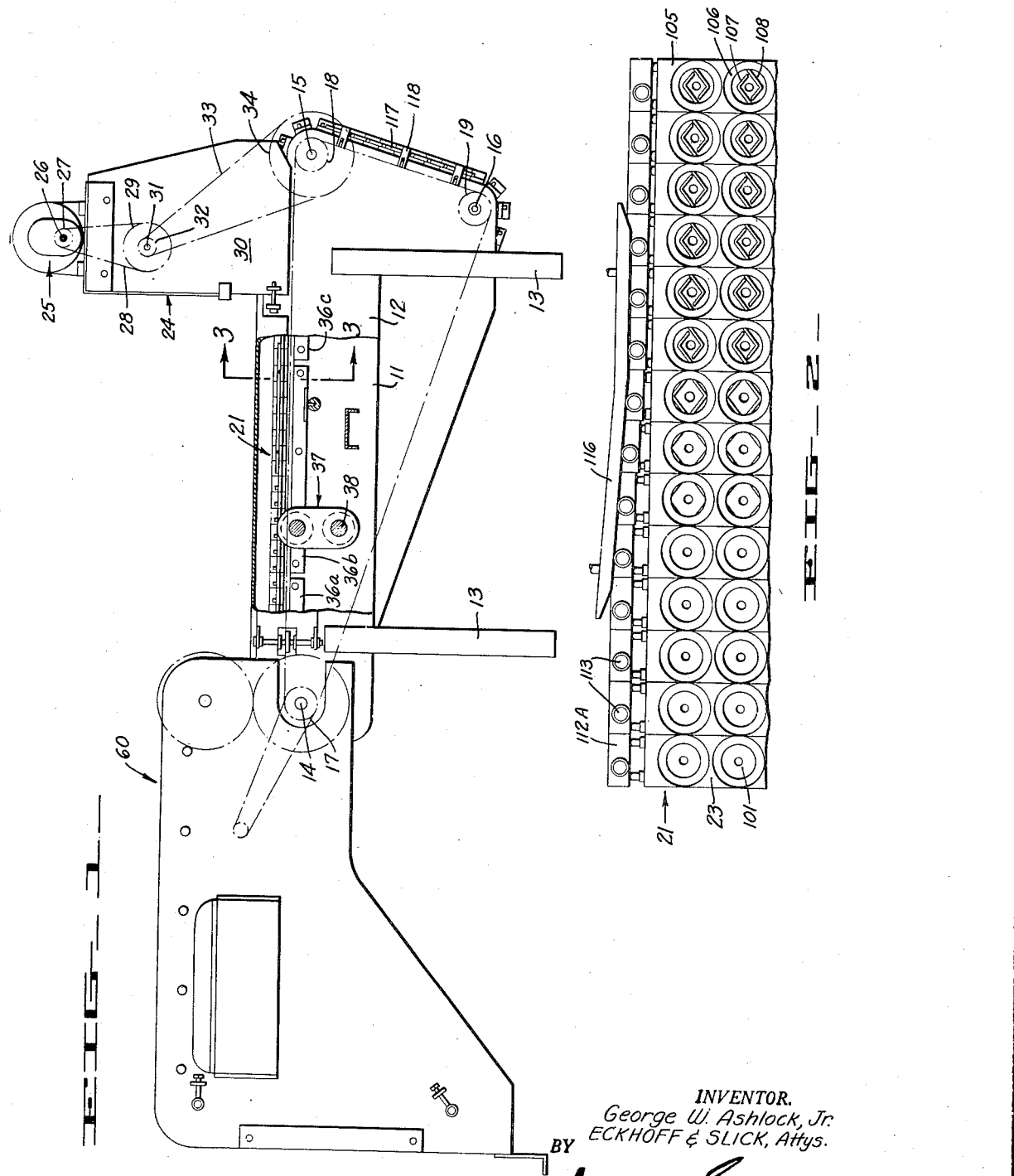
INVENTOR.
George W. Ashlock, Jr.
BY ECKHOFF & SLICK, Attys.
A member of the firm

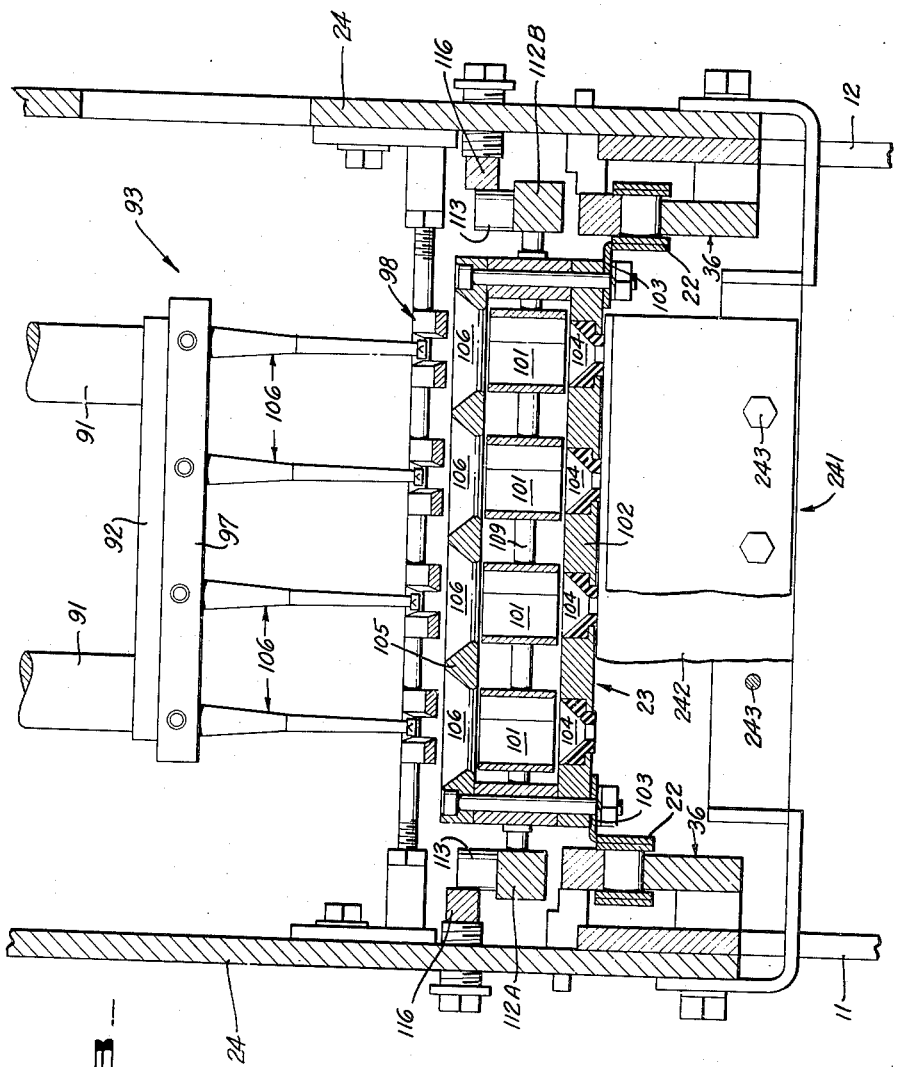

Sept. 7, 1954      G. W. ASHLOCK, JR      2,688,352
FRUIT PITTER HAVING MOVABLE HOLDERS FOR POSITIONING FRUIT
Filed April 14, 1952      3 Sheets-Sheet 3
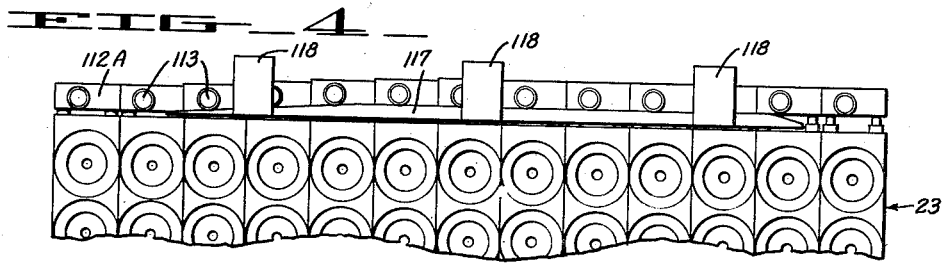
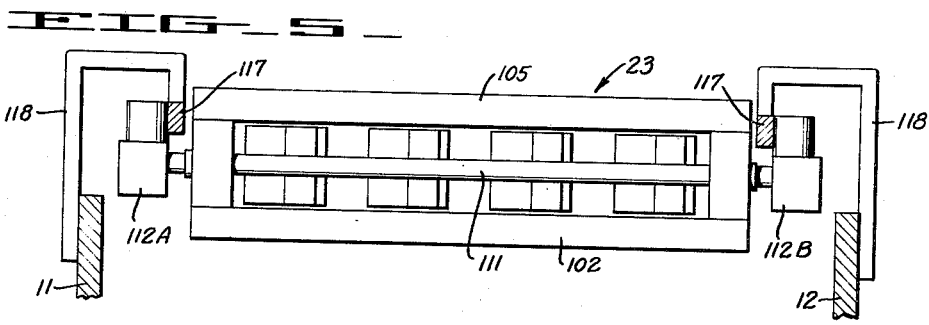
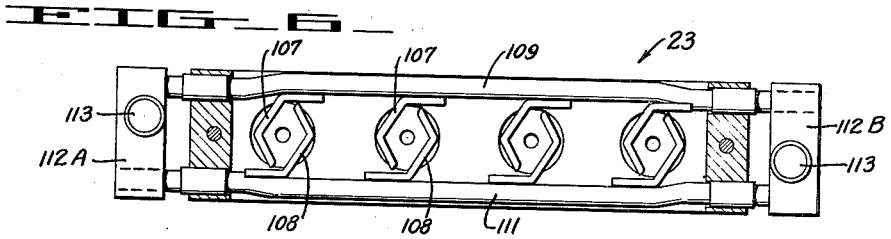
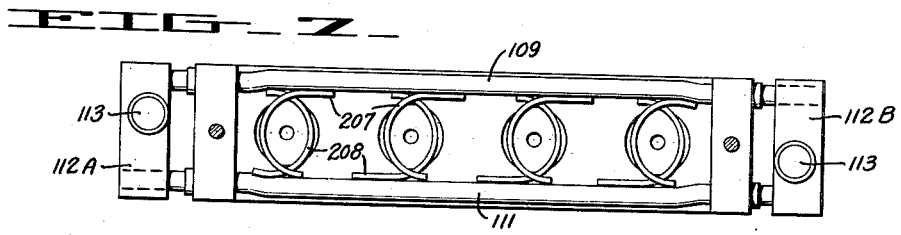
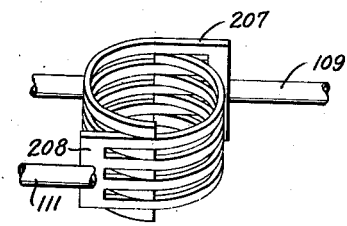
INVENTOR.
George W. Ashlock, Jr.
ECKHOFF & SLICK, Attys.
BY
A member of the firm Patented Sept. 7, 1954

2,688,352

UNITED STATES PATENT OFFICE 2,688,352

FRUIT PITTER HAVING MOVABLE HOLDERS FOR POSITIONING FRUIT

George W. Ashlock, Jr., Oakland, Calif.

Application April 14, 1952, Serial No. 282,118

3 Claims. (Cl. 146—17)

This invention relates to a machine for removing the pits from fruit having a minor axis and a major axis greater than the minor axis such as dates, fresh and dried prunes, and certain varieties of olives.

Dates and prunes present a special problem with respect to removal of the pit or stone because the individual fruits are of an irregular shape and because their high sugar content makes them quite sticky. In addition, it is sometimes advantageous to pit dried prunes while hot and wet so that the problem of alignment for stone removal is made more difficult.

It has been proposed heretofore to support each such fruit along a portion of one side and thereafter force the fruit stone through the supported side portion of the fruit. This has been successful to some extent, but resulted in the tearing of the side of the fruit through which the stone had been ejected; in addition, the stone carried with it such a portion of the fruit meat that considerable loss in weight of the fruit followed.

I have found that the fruit is best handled by positioning the fruit in a fruit holder having a cavity and placing the fruit in the cavity with the major axis of the fruit aligned with the major axis of the cavity. The surfaces defining the cavity are symmetrically disposed about its major axis, one at least of which is movable toward such axis to retain a fruit during pitting, the surfaces thereafter being moved apart to release the fruit. In this manner, the fruit can be positioned readily in the fruit holder, aligned, the pit removed, and the pitted fruit released.

It is in general the broad object of the present invention to provide a novel machine for positioning a fruit such as dates, prunes and the like in a predetermined position of alignment as a preliminary to a subsequent processing operation such as a stone removal step.

A further object of the present invention is to provide a novel mechanism for aligning durpaceous fruit with the axis thereof in a predetermined position.

An additional object of the present invention is to provide a machine adapted for the pitting of prunes, dates and the like to move the pit from the fruit along the major axis of the fruit and finally through an end of the fruit.

The invention includes other objects and features of advantage, some of which, together with the foregoing, will appear hereinafter wherein the present preferred form of mechanism embodying this invention is disclosed. In the drawing accompanying and forming a part hereof, Figure 1 is a side elevation showing a complete machine embodying the present invention.

Figure 2 is an enlarged plan view showing the means for closing the fruit holder mechanism upon the fruit during orientation.

Figure 3 is an enlarged section taken along the line 3—3 in Figure 1.

Figure 4 is an enlarged plan view showing the means for opening the fruit holder mechanism after pitting.

Figure 5 is a side view, partly in section, of a portion of the mechanism shown in Figure 4.

Figure 6 is an enlarged plan view, partly in section, of a fruit holder.

Figure 7 is an enlarged plan view of a modified form of holder.

Figure 8 is an enlarged perspective view of one of the holders shown in Figure 7.

The machine of the present invention includes a conveyor which is moved from a fruit delivery station whereat the fruit is deposited upon the conveyor to a processing station where, for example, the pit is removed from the fruit. It is a feature of the machine of the present invention that the fruit conveyor includes a plurality of receptacles which are advanced past the delivery station, a fruit being deposited in each receptacle. Each receptacle has a cavity therein having a major axis. The fruit is delivered to the cavity haphazardly, that is, the major axis of the fruit may or may not be aligned with the major axis of the cavity in the receptacle in which it is deposited so that a subsequent orientation step is desirable, if not essential. To assist orientation, that portion of the conveyor which advances away from the delivery station can be vibrated rapidly to facilitate turning of the fruit into a position in which the major axis of the fruit is aligned with the major axis of the cavity. During the orientation and immediately prior to pitting, the receptacle is closed upon the fruit to retain it during pitting in its aligned position wherein the fruit's major axis is coincident with the major axis of the cavity. While so retained, the fruit is pitted by forcing the stone through the fruit so that the stone emerges from an end of the fruit. Thereafter, the conveyor moving on its circuit, the receptacles are successively opened and the pitted fruit removed.

Referring to the drawing, the machine includes a frame made up of spaced side plates 11 and 12 supported in a parallel spaced relation and having legs 13 thereon. Shafts 14, 15 and 16 are mounted at opposite corners of the frame, the shafts respectively having pairs of sprockets 17, 18 and 19 thereon about which chains 22 are trained to provide a main fruit conveyor, generally indicated at 21. The upper run of conveyor 21 is supported by guide rails 36 provided along the inside of each of plates 11 and 12; the guide rails are preferably provided in several sections, 36a, 36b, and 36c, the first and last of which are secured to the inside face of each of side plates while the intermediate section, 36b, is movably supported on the side plates and is vibrated by the vibrating mechanism generally indicated at 37, at about 1800 alternations per minute. Such vibrating mechanism and the support of guide rail section 36b is further described in detail in my Patent 2,250,518 of July 29, 1941, the vibrator being of a mechanical type and including an eccentric operated off a rotating shaft 38, driven by a separate prime mover (not shown). Fruit holders, generally indicated as 23, are extended transversely between the chains. A sub-frame 24 is mounted upon side plates 11 and 12 and an electric motor-speed reducer unit, generally indicated at 25, is mounted thereon to drive suitable pitting mechanism generally indicated at 30 and which is more particularly shown in my Patents 2,157,518 and 2,219,832; the prime mover includes a shaft 26 having a sprocket 27 thereon driving a chain 28, this in turn being passed about a sprocket 29 on a shaft 31 in the pitting mechanism (corresponding to shaft 39 in the aforesaid patents). Also mounted on shaft 31 is a sprocket 32, chain 33 being trained about this and about a sprocket 34 on shaft 15 to drive the main fruit conveyor 21 in a timed relation with the pitting mechanism 30.

A feed conveyor 60 is mounted on the frame and is effective to discharge fruit onto the main conveyor as this moves away from sprocket 17. The details of the feed conveyor are shown in my application Serial No. 282,117, filed April 14, 1952, now Patent No. 2,630,205. However, so far as this invention is concerned, the fruit can be delivered to the main conveyor in any manner and can, for example, be fed by hand.

Each of the fruit holders 23 includes one or more cavities 101 for receiving fruit. In the machine shown, four cavities are provided across conveyor 21, but more or less can be provided, as desired. Each holder includes a base plate 102 secured between the conveyor chains and having ends 103 secured thereto. Centrally of each cavity 101 is mounted a rubber stone ejector 104, this being in the form of an annular rubber plug fitting in the base plate. A guide plate 105 is mounted on the ends 103, the guide plate having an inwardly tapered opening 106 over each cavity. The cavity side walls are defined by members 107 and 108 mounted cooperatively opposite one another to provide a cavity of variable size. Members 107 and 108 are mounted respectively on rods 109 and 111, which extend beyond ends 103 to roller carriers 112A and 112B, each having a roller 113 thereon. Roller carrier 112A is secured to rod 109 and is slidable on rod 111, while roller carrier 112B is secured to rod 111 and is slidable on rod 109.

Cam tracks 116 are provided on sub-frame 24 adjacent the horizontal run of the conveyor between sprockets 14 and 15 immediately ahead of and at the pitting station (Figures 2 and 3). The tracks 116 are positioned on opposite sides of the conveyor run to engage the outer faces of rollers 113 and move the cavity defining members 107 and 108 together upon the fruit confined between the faces defining each cavity and so retain the fruit during pitting under a slight compression.

Cam tracks 117 (Figures 1 and 4) are provided adjacent that run of the conveyor extending between sprockets 15 and 16 and wherein the conveyor moves downwardly. The tracks are supported by brackets 118 over the conveyor to engage the inner faces on each roller 113 and move the cavity defining members 107 and 108 apart and so release the pitted fruit.

The cavity defining members 107 and 108 are shown in Figures 2 and 6 as having planar side walls when viewed in a plan. This is illustrative only and represents only one form of cavity for one can use any cavity configuration suited to the fruit to be handled. Thus, one can use cavity defining members which provide polygonally shaped cavities when these are viewed in plan or, as shown in Figure 7, one can use a cavity which is substantially circular when viewed in plan. In addition, the ends of the cavities can be serrated, as is shown in Figure 8, so that one cavity member can intersect the other, the notched wall 207 of the cavity being offset with respect to the other cavity walls 208 so that one can pass the other and the two can approach one another to provide a cavity of reduced section, particularly suited to the handling of small fruit.

The pitting mechanism includes reciprocally mounted plunger 91 (corresponding to plunger 71 in my Patent 2,219,832) moved in a timed relation to the conveyor 21, the plunger ends having a plate 92 provided therebetween and to which the pitting mechanism, generally indicated at 93, is attached. A plate 97 is secured to plate 92; plate 97 carries a plurality of knives, generally indicated at 106, these being suitably detachably secured. The knives pass through a plate 98 positioned across the machine, the plate acting as a stripper to remove fruit adhering to each knife.

Extending across the machine, following the pitting station, is a bracket, generally indicated at 241, and which includes a vertically extending rubber plate 242, secured thereto as by studs 243. The rubber plate 242 extends to just beneath the lower portion of the conveyor to act as a wiper and remove fruit pits adhering to the underside of the pitting cavities.

In operation, the feed conveyor and the pitting conveyor move continuously in a timed relation, while the vibrating mechanism operates continuously to vibrate the intermediate portion of the pitting conveyor. The fruit is fed into the feed hopper from whence it is picked up and delivered onto the pitting conveyor wherein it is received; depending upon the feed mechanism utilized, the material may be delivered haphazardly and require considerable movement until the major axis of the fruit is in line with the major axis of the cavity. In any event, and irrespective of whether or not the fruit is fed in the manner so as to ensure its early orientation or is fed haphazardly and by hand, the squeezing action of the respective cavities results in the fruit being oriented with its major axis aligned with the major axis of the cavity by the time the fruit reaches the pitting station. At the pitting station the fruit stone is engaged whereby the stone is moved through the end of the fruit and does not turn, twist or break in the fruit. The release of the fruit stone through a relatively small aperture in an end of the fruit results in closure of the fruit end and one can hardly tell that the fruit stone has been removed. Subsequently, as the conveyor moves along, the respective cavities are opened and the fruit therein is permitted to drop out.

I claim:

1. In a machine of the character described, a movable conveyor having a series of fruit holders, each of said fruit holders comprising a base having opposite end members, a pair of rods slidably mounted in and extending beyond each of said end members, a pair of rod operating members each provided on opposite sides of said base and each being secured to only one of said rods and slidable on the other of said rods to move said rods relative to one another when said rod operating members are moved relative to one another, cam follower members on each of said rod operating members, and cams on both sides of said conveyor to actuate said cam followers, and complementary and cooperating fruit holder members including sidewalls mounted on each of said rods to provide a series of fruit receptacles between the rods which are of variable size in accordance with the movement of the rods.

2. The device of claim 1 in which the fruit holder members cooperate to provide a fruit cavity polygonally shaped in cross section and of a height substantially equal to the length of a fruit positioned in said cavity.

3. In combination with a fruit pitting mechanism, a movable conveyor having a series of fruit holders, each of said fruit holders comprising a base having opposite end members, a pair of rods slidably mounted in and extending beyond each of said end members, a pair of rod operating members each provided on opposite sides of said base and each being secured to only one of said rods and slidable on the other of said rods, to move said rods relative to one another when said rod operating members are moved relative to one another and cam follower members on each of said rod operating members, and cams on both sides of said conveyor to actuate said cam followers, and complementary and cooperating fruit holder members including sidewalls mounted on each of said rods to provide a series of fruit receptacles between the rods which are of variable size in accordance with the movement of the rods, said movable conveyor passing over a series of fruit pitting rubbers having pitting plungers associated therewith.

References Cited in the file of this patent

UNITED STATES PATENTS

| Number | Name | Date |
| --- | --- | --- |
| 1,071,333 | Pease | Aug. 26, 1913 |
| 2,232,207 | Carroll | Feb. 18, 1941 |
| 2,250,518 | Ashlock, Jr. | July 29, 1941 |
| 2,265,515 | Carroll | Dec. 9, 1941 |
| 2,407,126 | Ashlock, Jr. | Sept. 3, 1946 |
| 2,485,653 | Peel | Oct. 25, 1949 |
| 2,612,197 | Giordano | Sept. 30, 1952 |